United States Patent [19]

Neki et al.

[11] Patent Number: 4,516,061
[45] Date of Patent: May 7, 1985

[54] SEWING MACHINE HAVING A MEMORY FOR GENERATING A SPEED SIGNAL IN RESPONSE TO OPERATING CONDITIONS

[75] Inventors: Shigeo Neki, Osaka; Nozomu Shinozaki; Takashi Dohi, both of Hirakata, all of Japan

[73] Assignee: Matsushita Electric Industrial Co., Ltd., Japan

[21] Appl. No.: 386,784

[22] Filed: Jun. 7, 1982

[30] Foreign Application Priority Data

Jun. 10, 1981 [JP] Japan .................. 56-89044
Jun. 10, 1981 [JP] Japan .................. 56-89045
Jun. 11, 1981 [JP] Japan .................. 56-89872

[51] Int. Cl.³ ............................ G05B 19/42
[52] U.S. Cl. ..................... 318/561; 318/568
[58] Field of Search ........... 318/685, 696, 568, 561, 318/341, 318, 381; 112/121.12

[56] References Cited

U.S. PATENT DOCUMENTS

| 2,978,693 | 4/1961 | Champion . |
| 3,268,788 | 8/1966 | Branco . |
| 3,514,685 | 5/1970 | Burgess . |
| 3,543,116 | 11/1970 | Hanner . |
| 3,621,352 | 11/1981 | Dinger . |
| 3,731,301 | 5/1973 | Davis . |
| 4,040,508 | 8/1977 | Sunada et al. . |
| 4,052,646 | 10/1977 | Massey et al. . |
| 4,104,978 | 8/1978 | Takahashi . |
| 4,130,785 | 12/1978 | Penet . |
| 4,139,808 | 2/1979 | Matsumura . |
| 4,153,863 | 5/1979 | Schachte et al. . |
| 4,227,137 | 10/1980 | Hartman . |
| 4,278,925 | 7/1981 | Minakuchi . |
| 4,298,832 | 11/1981 | Acker et al. . |
| 4,389,604 | 6/1983 | Beasco ..................... 318/568 |

FOREIGN PATENT DOCUMENTS 8002780 12/1980 PCT Int'l Appl. .

Primary Examiner—S. J. Witkowski
Assistant Examiner—Saul M. Bergmann
Attorney, Agent, or Firm—Lowe, King, Price & Becker

[57] ABSTRACT

Disclosed is a sewing machine having a tachogenerator for generating pulses at a frequency proportional to the speed of the sewing machine and a position detector for detecting the position of a foot pedal. A sewing condition detector is provided for detecting the operating conditions of the sewing machine in which it is to be subsequently operated and generating therefrom a corresponding condition indicating signal and a manually adjustable binary code generator for generating a speed indicating binary code in response to the condition indicating signal. Further included is a digital memory responsive to the position indicating signal and the speed indicating binary code for generating a speed control digital signal. The pulses generated by the tachogenerator are processed in accordance with the speed control digital signal to control the amount of motive power transmitted from a motor to the sewing machine.

10 Claims, 6 Drawing Figures

SEWING MACHINE HAVING A MEMORY FOR GENERATING A SPEED SIGNAL IN RESPONSE TO OPERATING CONDITIONS

BACKGROUND OF THE INVENTION

The present invention relates to sewing machine speed control systems, and in particular to a digital sewing machine speed control system in which machine speed is controlled in response to a digital speed setting signal. This invention is particularly advantageous for adaptation to microcomputers and also to manual selection of a desired operating speed characteristic to meet the operating conditions and to the operator's skill.

Conventional sewing machine speed control systems include an analog circuit that generates an analog-speed setting signal in response to the amount of depression of an operator-controlled foot pedal. The analog speed setting signal is typically generated by a magnetic flux sensor located with respect to a permanent magnet which is mounted for movement with the foot pedal, whereby the depression of the pedal results in a variation in the amplitude of the output of the magnetic flux sensor.

It is of particular importance to the proper functioning of industrial sewing machines that the sewing machine speed be closely controlled in response to incremental changes in pedal depression. Furthermore, it is desired that the sewing machine have a particular speed varying characteristic for each operating condition. It is further desired that the foot pedal depression versus speed characteristic be optimized for the level of skill and the specific needs of the operator.

However, it is almost impossible for conventional analog speed control system to achieve precision speed control as well as manual selection of operating characteristics. Further, the analog system is not adaptable to integrated-circuits and to microcomputer applications.

Copending U.S. patent application No. 199,704 filed Oct. 23, 1980 by the same applicants as the present invention, now U.S. Pat. No. 4,386,301, discloses a sewing machine speed control system having a position detector for generating a binary code in response to the amount of depression of foot pedal, manually operated switches, and a read only memory for generating a speed control signal in response to the position indicating binary code and to the operating states of the switches.

SUMMARY OF THE INVENTION

It is therefore an object of the present invention to provide a sewing machine of which the operating speed is controlled as a function of foot pedal depression and as a function of the operating condition of the sewing machine and in which the operating speed is optimized for the operator's skill.

The sewing machine embodying the present invention comprises a motor for operating the sewing machine under various operating conditions in accordance with the position of a manually operated foot pedal, a tachogenerator for generating pulses at a frequency proportional to the speed of the sewing machine, and a position detector for detecting the position of the foot pedal and generating therefrom a position indicating signal. According to the invention, the sewing machine control system includes a condition detector for detecting each of a plurality of operating conditions in which the sewing machine is to be subsequently operated at a particular speed and generating therefrom a corresponding condition indicating signal and manually adjustable binary code generators for generating speed indicating binary codes respectively in response to the condition indicating signals. Further included is a digital memory responsive to the position indicating signal and the speed indicating binary codes for generating a digital speed control signal. The pulses generated by the tachogenerator are processed to control the amount of motive power transmitted from the motor to the sewing machine in response to the digital speed control signal.

Each of the manually adjustable binary code generators is arranged to generate a binary code which can be manually selected for low speed, medium speed and high speed ranges. Each of the speed indicating binary codes is supplied to the memory in response to the corresponding condition indicating signal. When low-speed condition is detected a corresponding low-speed control digital signal is read out of the memory for controlling the speed of the sewing machine to a desired low value to allow the operator to effect thread cutting operation. Preferably, the processing circuit includes a transfer circuit which translates the interval between succesive pulses generated by the tachogenerator into a duration in which the sewing machine is to be subsequently accelerated or decelerated in accordance with a predetermined formula including a parameter which is variable as a function of the low-speed control digital signal read out of the memory. When the medium and high speed operating conditions are detected, corresponding medium-speed and high-speed control digital signals are read out of the memory respectively in accordance with the medium-speed and high-speed indicating binary codes for dividing the frequency of the pulses generated by the tachogenerator at a variable input to output frequency ratio to operate the sewing machine at desired medium and high speeds. During the high speed operation, the position indicating signal is applied to the memory to read out the stored data as a function of the amount of depression of the foot pedal and as a function of the high-speed range setting of the binary code generator. The maximum speed of the sewing machine is thus limited automatically in a variable range according to the high-speed setting of the code generator even though the foot pedal is depressed to the fullest extent.

BRIEF DESCRIPTION OF THE DRAWINGS

The present invention will be described in further detail with reference to the accompanying drawings, in which.

DETAILED DESCRIPTION

Figure 1:
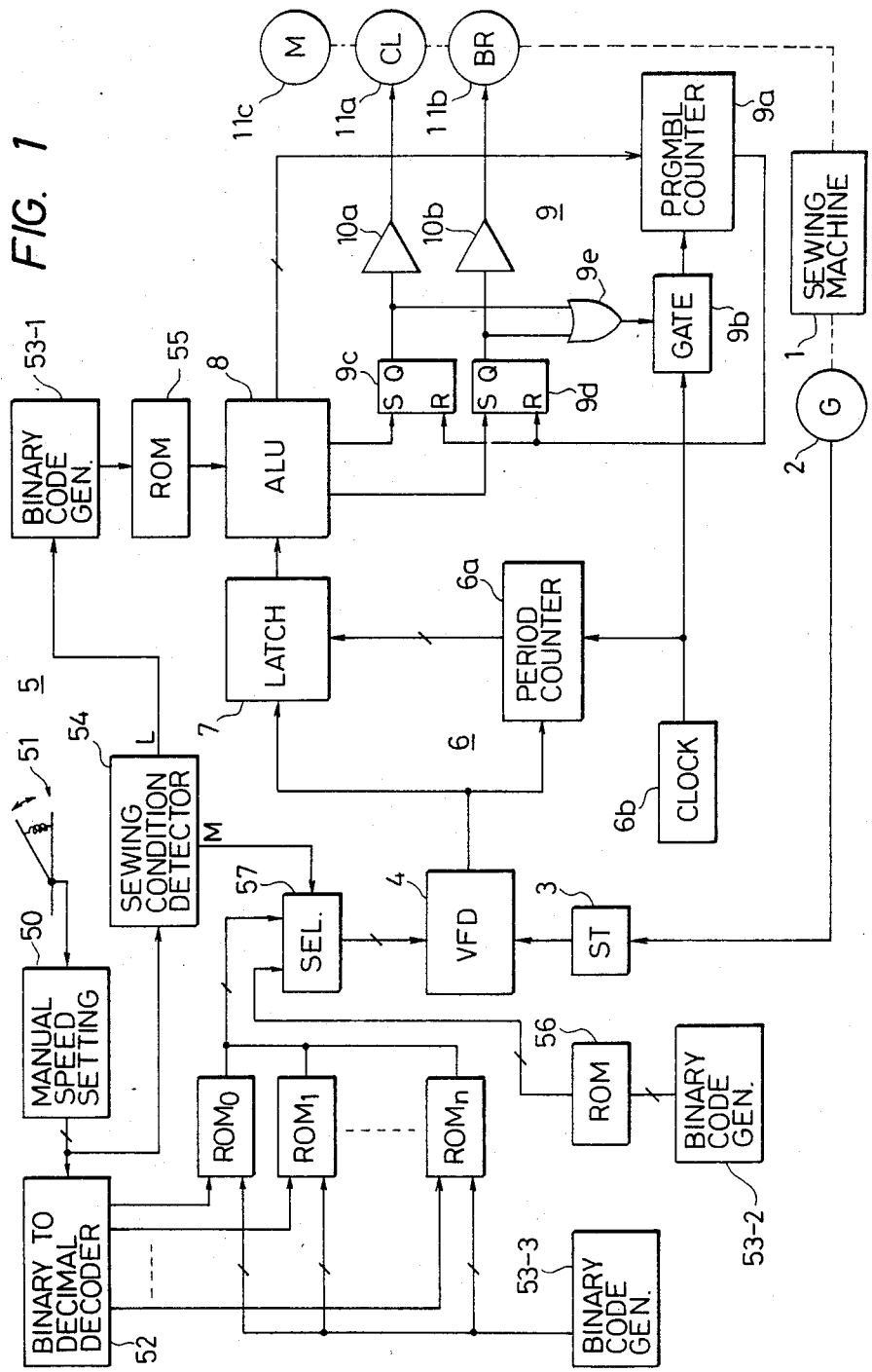
FIG. 1 is a block diagram of the speed control system according to the invention.

Referring now to FIG. 1, a sewing machine speed control system of the invention is schematically illustrated. The system includes a sewing machine speed setting circuit generally indicated at 5 which provides a variable speed control digital signal as a function of the amount of operator's foot pedal depression and as a function of sewing machine operating conditions in a manner as will be described in detail. A tachogenerator 2 of a conventional construction has its rotor operatively connected to the driven shaft of the sewing machine 1 which is driven by a motor 11c. This motor has a driving shaft which is coupled to the driven shaft of the sewing machine by a pulley-and-belt arrangement when a solenoid clutch or coil 11a is energized. The rotor shaft of motor M is decoupled from the sewing machine by a solenoid brake or coil 11b which applies braking to the driven shaft of the sewing machine. Thus the speed of the sewing machine is controlled by the variable duration in which the solenoid and brake 11a and 11b are energized. Since the details of the motor construction is well known in the art, FIG. 1 only illustrates the associated parts in schematic form for the sake of simplicity. The tachogenerator 2 typically generates a train of 60 equally spaced apart impulses per revolution when the rotor turns at a speed of 200 rpm. The generated impulses are shaped into sharply defined, rectangular pulses by a wave shaping circuit 3, preferably a Schmitt trigger, and applied to a variable frequency divider 4. The frequency divider 4 comprises a programmable counter connected to the Schmitt trigger 3 for dividing the frequency of the pulses therefrom at a variable ratio of input to output frequency in response to a speed control digital signal. The interval between successive pulses from the frequency divider 4 is measured by counter means 6 comprising a binary counter 6a which is arranged to be enabled in response to each pulse from the divider 4 for counting clock pulses from a clock source 6b and is arranged to be reset in response to a subsequent divider output pulse. The counted clock pulses are presented in the form of a 4-bit binary code to a latch 7 in response to the occurrence of each divider output pulse. The latched binary code will then be read in response to the next output of the frequency divider into an arithmetic unit 8. The arithmethic unit 8 may be a digital function generator or transfer circuit which translates the input signal applied thereto to an output signal in accordance with a predetermined transfer function describing the relationship between the interval measured by period counter 6a and a predicted pulse duration in which either one of coils 11a and 11b is to be subsequently energized. As will be described in detail hereinbelow, the arithmetic unit 8 provides an acceleration or deceleration signal depending on whether the measured pulse interval is greater or smaller than a value determined by the transfer function and provides an output in the form of a binary signal representing the predicted pulse duration, the binary signal so generated being supplied to a pulse generator circuit 9.

More specifically, the transfer function of the arithmetic unit is described as $T = At - B$ where T represents the duration in which the coil 11a or 11b is to be energized and t represents the interval detected by the period detector 6, A is a constant that determines the response characteristic of the speed control system, and B is a parameter which, as described later, is manually variable when the sewing machine is operated in a low speed range while the frequency dividing factor of the variable frequency divider 4 is maintained constant, typically at unity.

The pulse generator 9 comprises a programmable counter 9a of which the full count value is preset to the binary signal from the arithmetic unit 8 and is clocked by source 6b through a gate 9b to increment its count to generate an output when the preset count is reached. The pulse generator circuit 9 further includes flip-flops 9c and 9d and an OR gate 9e. Flip-flops 9c and 9d respond respectively to acceleration and deceleration signals from arithmetic unit 8 to activate coils 11a and 11b through linear amplifiers 10a and 10b. The outputs of flip-flops 9c and 9d are coupled via OR gate 9e to the control terminal of gate 9b to pass clock pulses from source 6b to programmable counter 9a. Gate 9b is thus open in response to each of the acceleration and deceleration signal to cause programmable counter 9a to be incremented. On full count, the programmable counter 9a resets flip-flops 9c and 9d. Thus, flip-flops 9c and 9d each remain in a "1" state for a duration determined by the arithmetic unit 8, and clutch and brake coils 11a and 11b are correspondingly energized.

For purposes of explanation, with the frequency divider 4 being adjusted to 1:1 ratio, the tachogenerator 2 is assumed to generate 60 impulses per revolution for a sewing machine speed of 200 rpm. The detected pulse interval t is 5 milliseconds which corresponds to the T-value of 2 milliseconds. This means that clutch coil 11a is energized with a duty cycle of 40%.

If the sewing machine speed decreases in response to an increase in sewing load, the measured pulse interval t will increase by an amount determined by the transfer function. An acceleration signal is generated from arithmetic unit 8 to trigger flip-flop 9c, so that clutch coil 11a is energized with a duty cycle greater than 40%. Since the sewing machine speed is proportional to an average value of successsive energization times of coils 11a and 11b, an increase in the duty cycle results in acceleration of the sewing machine until it reaches 200 rpm. Conversely, a decrease in sewing machine load results in a decrease in duty cycle for clutch energization until the sewing machine speed decreases to 200 rpm. If the machine speed further increases beyond 250 rpm so that the measured pulse interval is 4 milliseconds, a deceleration signal is generated to trigger the flip-flop 9d to energize brake coil 11b. As a result, the sewing machine speed rapidly decreases to 200 rpm.

If the frequency division ratio changes from unity to ½, the measured pulse interval t will be doubled with a corresponding increase in clutch duty cycle and the sewing machine speed increases to 400 rpm where the speed is stabilized again. With the system so stabilized, the pulse interval t and hence the duty cycle assumes the same value as when the sewing machine was previously run at 200 rpm for a unity frequency division ratio, so that the measured interval t and duty cycle values are maintained constant regardless of transient conditions once the system is stabilized to a new division ratio. The operating speed of sewing machine 1 can thus be varied at increments of an integral multiple of 200 rpm.

According to the present invention, the speed setting circuit 5 comprises a digital speed setting device 50 which is manually operated in response to the operator's foot pedal 51. The detail of the speed setting device 50 is shown and described in the aforesaid U.S. Pat. No.

4,386,301. Briefly described, the speed setting device 50 generates a 4-bit binary signal, or BCD (binary coded decimal number) signal, at increments of a predetermined amount of foot pedal depression, the signal being applied to a binary-to-decimal converter 52 where the BCD signal is converted to a decimal number. The converter 52 activates one of its output terminals 0 through n corresponding to the decimal number. These output terminals are coupled respectively to "enable" inputs of read only memories $ROM_0$ to $ROM_n$. In the cell locations of each read only memory are stored a set of speed control data representing input to output frequency ratios for the variable frequency divider 4 for operating the sewing machine in a range of high speeds for normal stitching operations.

The binary signal from the speed setting device 50 is also applied to a sewing condition detector 54 where the binary input is analyzed for the purpose of detecting whether the sewing machine is to be run at a low speed for thread cutting operation or at a medium speed for back tacking operation. During these particular sewing conditions, the frequency dividing factor of the variable frequency divider 4 is held constant at the unity value.

Figure 2:
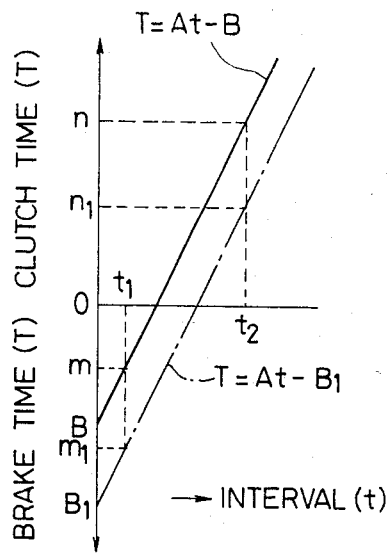
FIG. 2 is a graphic illustration of the operating characteristic of the sewing machine according to the invention.

When a low speed operation is detected an output terminal L is activated and when a medium speed operation is detected an output terminal M is activated. The speed setting circuit 5 further includes manually adjustable binary code generators 53-1, 53-2 and 53-3, or code switches, the detail of which will be described later. The binary code generator 53-1 is connected to the sewing condition detector 54 to respond to the signal on terminal L to generate a 4-bit binary signal for addressing a read only memory 55 to read therefrom a parameter datum $B_1$ to substitute for the parameter B of the formula described above. The signal read out of the memory 55 is supplied to the arithmetic unit 8 to cause it to operate on a formula $T = At - B_1$. As shown in FIG. 2, the transfer function of the arithmetic unit 8 is shifted from the solid line to a dot-and-dash line and for a given pulse interval $t_1$, the brake operating time is increased from m to $m_1$ and for a given pulse interval $t_2$ the clutch operating time is reduced from n to $n_1$. Therefore, the speed of the sewing machine 1 is reduced to a minimum value and since this minimum value is variable as a function of the manually adjustable binary signal generated in the binary code generator 53-1 it can be varied at sixteen steps.

The binary code generator 53-2 supplies a manually adjusted address signal to a read only memory 56 to read a medium speed control datum therefrom for application to a selector 57 to which is also supplied a 4-bit binary signal from the read only memories $ROM_0$ to $ROM_n$. When a medium speed condition is detected by the condition detector 54, the medium speed control datum from the memory 56 is selected by selector 57 and applied to the frequency control terminal of the variable frequency divider 4 so that the input to output frequency ratio changes so that the sewing machine speed shifts to a medium value for back tacking operation. Similar to the low speed operation, the medium speed is also manually adjustable at sixteen steps.

The binary code generator 53-3 also provides a manually adjusted address signal which is applied to the address inputs of read only memories $ROM_0$ to $ROM_n$. When the sewing machine is to be operated at a high speed for normal stitching operation the foot pedal is depressed deeply forward and in this instance no output is generated in the condition detector 54. The binary to decimal decoder 52 now enables one of the read only memories $ROM_0$ to $ROM_n$ corresponding to the amount of pedal depression. The enabled read only memory is now addressed by the code generator 53-3 and the data read therefrom is passed through selector 57 to the variable frequency divider 4.

Figure 3:
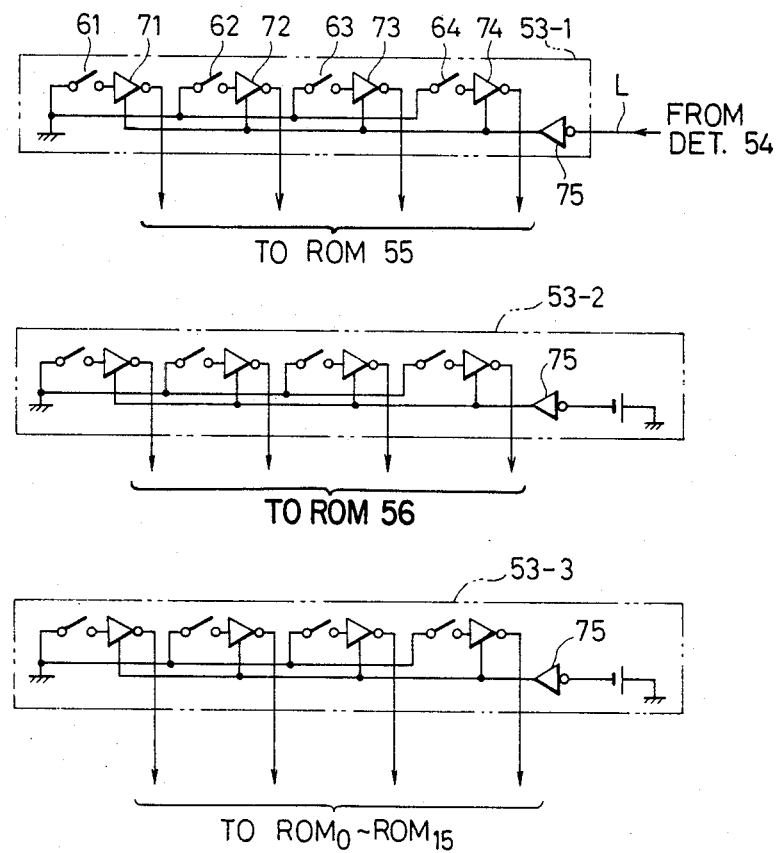
FIG. 3 is an illustration of the detail of an embodiment of the binary code generator of FIG. 1.

Referring to FIG. 3, details of the manually adjustable binary code generators 53 are illustrated. Each of the code generators 53 comprises a set of four switches 61 to 64 and corresponding buffer amplifiers 71 to 74 respectively connected by the switches to ground. The buffer amplifiers 71 to 74 are enabled simultaneously by an input amplifier 75. The input amplifier 75 of the code generator 53-1 is coupled from the output terminal L of the condition detector 54, while the input amplifiers 75 of the code generators 53-2 and 53-3 are coupled to a suitable voltage source. The open and closed circuit conditions of the switches in each code generator are manually controlled to respectively indicate "0" and "1" states yielding 16 different combinations. It is preferable that each code generator be in the form of a rotary encoder constructed in accordance with the Gray code pattern.

Figure 4:
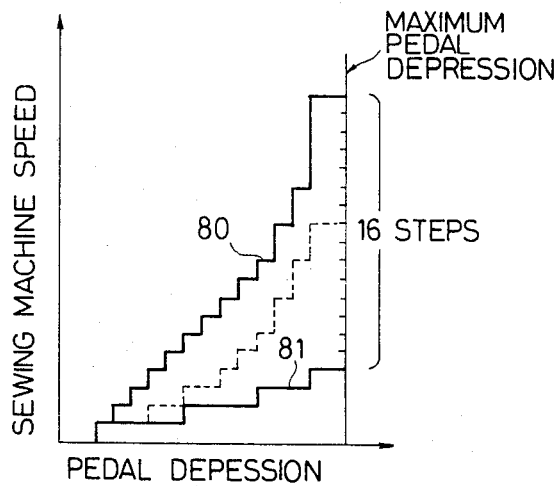
FIG. 4 is a graphic illustration of the operating speed of the sewing machine as a function of pedal depression during high speed operations.

While the sewing machine is operated at manually adjusted constant speeds during low and medium speed operations, the high speed, normal stitching operation is effected at a variable speed as a function of the pedal depression. In response to the setting of the binary code generator 53-3 the pedal-depression versus sewing machine speed characteristic can be varied between characteristics shown at 80 and 81 in FIG. 4. It is seen that 16 different characteristics are available and the maximum speed obtainable at full pedal depression is also variable at 16 steps. Therefore, the operator is allowed to select desired speeds individually for low, medium and high speed operations commensurate with the level of her skill.

Figure 5:
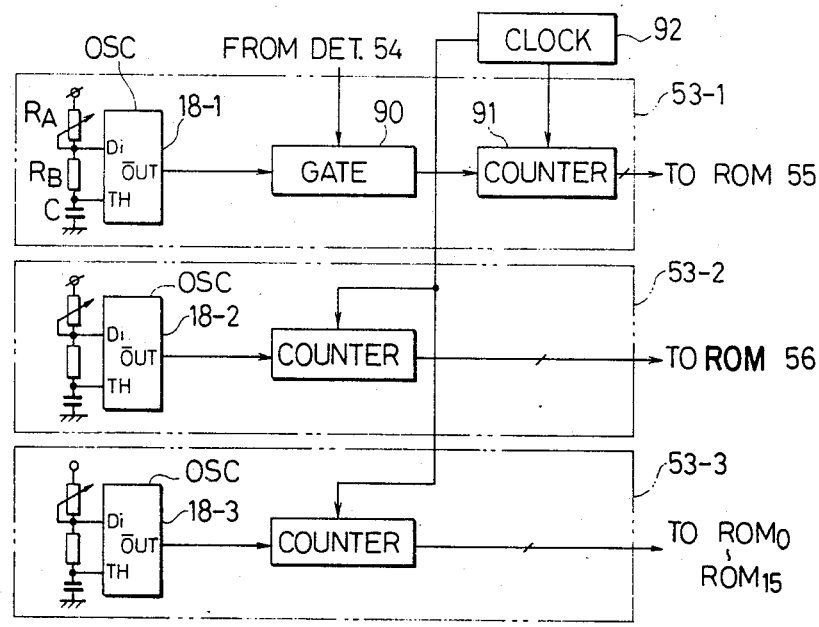
FIG. 5 is an alternative embodiment of the binary code generator.
Figure 6:
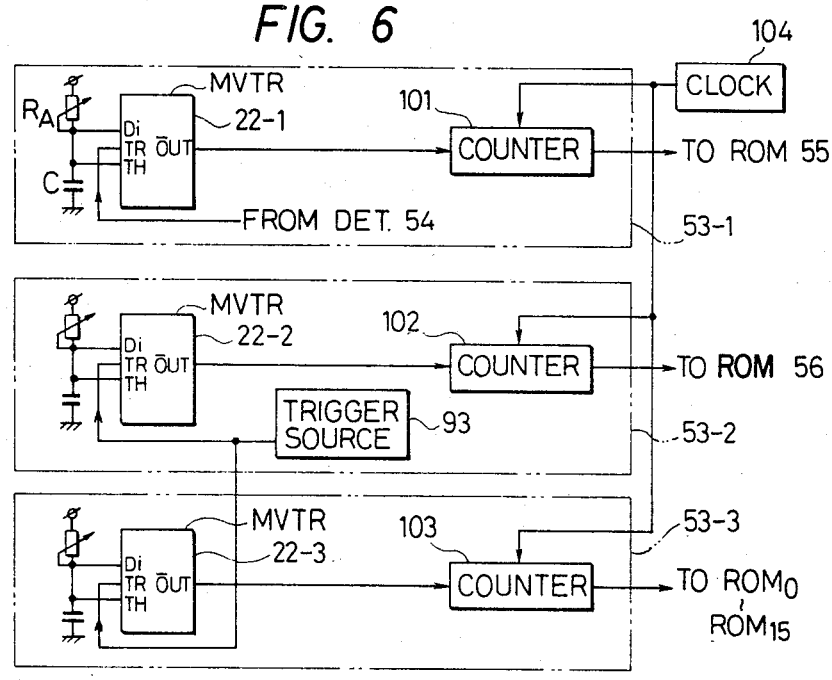
FIG. 6 is a further alternative embodiment of the binary code generator.

Alternative embodiments of the binary code generators 53 are illustrated in FIGS. 5 and 6.

In FIG. 5, each of the generators 53 comprises a free-running integrated-circuit, pulse-width modulated oscillator 18. A variable resistor RA, a constant-value resistor RB and a capacitor C are connected in series between voltage source and ground to form a variable time constant circuit, the junction between the resistors RA and RB being coupled to an input Di of the oscillator 18 and the junction between the resistor RB and capacitor C being coupled to another input TH of the oscillator. By means of the variable resistor RA the time constant value is controlled and a train of pulses having the desired duration is obtained at the output OUT of each oscillator. The pulses delivered from the oscillator 18-1 are supplied through a gate 90 to a pulse duration counter 91 which is clocked by a clock source 92. The L output of the condition detector 54 is coupled to the control terminal gate 90 to cause the counter 91 to initiate measuring the duration of the applied pulse by counting the clock pulse in response to the leading edge of the oscillator pulse and terminating the count in response to its trailing edge to generate a 4-bit binary code representing the duration of the pulse.

In FIG. 6, each of the code generators 53 comprises an integrated-circuit monostable multivibrator 22 and a time constant circuit formed by variable resistor RA and capacitor C with the junction therebetween being coupled to inputs Di and TH of the multivibrator. Each multivibrator includes a trigger input TR which is coupled to a respective trigger source. The trigger input of multivibrator 22-1 is coupled from the L output of condition detector 54 and the trigger outputs of multivibrators 22-2 and 22-3 are coupled to a common trigger source 93 which constantly triggers the multivibrators 22-2, 22-3 at a prededtermined rate. The outputs of the multivibrators 22-1, 22-2 and 22-3 are coupled respectively to pulse duration counters 101, 102 and 103 which are clocked by a common source 104. The counted period is indicated by a 4-bit code in the same manner as in FIG. 5.

Various modifications are apparent to those skilled in the art without departing from the scope of the invention which is only limited by the appended claims. For example, the electronic circuit elements of FIG. 1 including the read only memories, sewing condition detector 54, selector 57, variable frequency divider 4, latch 7, arithmetic unit 8, counter means 6, and pulse generating circuit 9 could be readily realized to advantage by a microcomputer.

What is claimed is:

1. A sewing machine having a motor for transmitting its motive power to a drive shaft of the sewing machine under various operating conditions in accordance with the position of a manually operated pedal, comprising in a closed loop:

tachogenerator means for generating pulses at a frequency proportional to the speed of the sewing machine;

position detecting means for detecting the position of said manually operated pedal and generating therefrom a position indicating signal;

manually adjustable signal generating means for generating a first and a second speed range indicating signal when the sewing machine is to be operated at a speed in a first and a second speed range, respectively;

memory means for storing speed control signals respectively in locations addressible as a function of said position indicating signal and as a function of said first and second speed range indicating signals; and means for processing the pulses generated by said tachogenerator means to control the amount of the motive power of said motor transmitted to the sewing machine in accordance with the speed control signal addressed from said memory means.

2. A sewing machine as claimed in claim 1, wherein said processing means comprises variable frequency dividing means for dividing the frequency of the pulses generated by said tachogenerator means at a variable ratio of input to output frequency in response to said speed control signal addressed from said memory means, counter means connected for measuring the interval between successive pulses from the output of said frequency dividing means, and means coupled to said counter means for translating said measured interval according to a predetermined transfer function describing the relationship between said measured interval and a duration in which said sewing machine is to be subsequently accelerated or decelerated and for generating a corresponding output signal, and means for controlling the motive power of said motor transmitted to said sewing machine in response to said output signal.

3. A sewing machine as claimed in claim 2, wherein said translating means comprises means for generating a first output signal in accordance with said transfer function when said measured interval is greater than a predetermined value and a second output signal when said measured interval is smaller than said predetermined value, and said processing means further comprises means for converting said first and second output signals into first and second speed control pulses of said duration respectively, solenoid clutch means responsive to said first speed control pulse for transmitting the motive power of said motor to the sewing machine, and solenoid brake means responsive to said second control pulse for applying braking to said sewing machine.

4. A sewing machine as claimed in claim 2, wherein said relationship is given by a formula $T=At+B$ where T is said duration, A is a constant representing the gain of said closed loop, t is said measured interval and B is a parameter, and wherein said memory means includes means for storing a set of a low-speed control signals each of which is read out of the memory means in response to said first speed indicating signal for substituting the speed control signal read out of the memory means for said parameter B.

5. A sewing machine as claimed in claim 4, wherein said adjustable signal generating means further comprises means for generating a third speed indicating signal when the sewing machine is operated at a third speed, and said memory means includes means for storing a set of medium-speed control signals each of which is read out of the memory means in response to said third speed indicating signal for varying the input to output frequency ratio of said variable frequency dividing means and a set of high-speed control signals each of which is read out of the memory means in response to said second speed indicating signal for varying said ratio.

6. A sewing machine as claimed in claim 2, 4 or 5, wherein said manually adjustable signal generating means comprises a plurality of switches each being manually adjustable to generate a signal.

7. A sewing machine as claimed in claim 6, wherein said switches are arranged to be operated in accordance with a Gray code.

8. A sewing machine as claimed in claim 2, 4 or 5, wherein said manually adjustable signal generating means comprises a manually adjustable time constant circuit, pulse-width modulated oscillator means for generating a pulse having a duration variable in response to the setting of said time constant circuit, and counter means for measuring the duration of the pulse generated by said oscillator means.

9. A sewing machine as claimed in claim 2, 4 or 5, wherein said manually adjustable signal generating means comprises a manually adjustable time constant circuit, a variable monostable multivibrator means for generating a pulse having a duration variable in accordance with the setting of said time constant circuit, and counter means for measuring the duration of the pulse generated by said monostable multivibrator means.

10. In a sewing machine having a motor for transmitting its motive power to a drive shaft of the sewing machine and having a manually operated pedal, a method of operating the motor under various operating conditions, comprising the steps of:

generating pulses at a frequency proportional to a sewing speed of the sewing machine;

detecting the position of the manually operated pedal and in response thereto generating a position indicating signal;

generating first and second speed range indicating signals corresponding to desired ranges of speeds to which the machine is to be operated depending upon human operator skill;

storing speed control signals respectively in locations of a memory addressible as a function of the position indicating signal and as a function of the first and second speed range indicating signals; and processing the sewing speed responsive pulses to control the amount of motive power of the motor transmitted to the sewing machine in accordance with the addressed speed control signal in the memory.

* * * * *